United States Patent Office 3,075,836
Patented Jan. 29, 1963

3,075,836
SOIL CONDITIONING COMPOSITION
Lloyd H. Jackson, Box 2190, Vernon, Tex.
No Drawing. Filed Dec. 4, 1959, Ser. No. 857,255
1 Claim. (Cl. 71—24)

The present invention relates to an improved soil conditioning composition and more particularly to an organic plant food capable of varying the soil alkalinity to the proper pH required for suitable plant growth.

Broadly, my invention consists of a mixture of ground acid delinted cottonseed culls and degenerate hydrocellulose containing hydrochloric acid, the hydrocellulose being in preponderant proportion. Preferably the compositions also contain a substantial proportion of peat moss. The new compositions obtained by mixing these ingredients and allowing possible chemical reaction of the constituents to take place has been found to be superior to other similar plant foods primarily intended for use on land of the type located in the arid and semi-arid regions of the United States where the soil is neutral to highly alkaline. Additional fertilizer components may also advantageously be added to the compositions.

It has been found from experimentation that soil conditioning compositions made in accordance with my invention will lower the pH of soils from a high of 8–5 to as low as 5.5 pH which is very acid or to any intermediate point. It is a well established fact that nearly all flowers, fruits, vegetables, lawns, and trees thrive in a slightly acid to highly acid soil in a range from a pH of approximately 5.5 to a pH of 6.5.

More specifically the soil conditioning compositions may be formed by mixing the following constituents in the following manner:

Initially a supply of hydrocellulosic substance containing hydrochloric acid is placed in a suitable mixing vessel. This material is a by-product of the process of delinting cottonseed and more particularly it is the lint from cottonseed after being processed for planting purposes by treating cottonseed with dry hydrochloric acid gas at a temperature in the order of 140° F. The delinting process is employed to remove the lint from the cottonseed after the cotton has been subjected to ginning to remove the bulk of the fiber, leaving on the seed only a residual coating of short fibers, or "linters." The delinting process removes the residual lint from the seed so that the resultant seed may be used for planting after a culling operation.

The remaining residue which is a degenerate hydrocellulosic substance containing hydrochloric acid is highly organic and has been decomposed by the processing to very nearly humus.

Next, a supply of ground acid delinted cottonseed culls is added to the degenerate hydrocellulose mentioned in the above paragraph. These cottonseed culls are also a by-product from the delinting processing plants and in effect are the delinted seeds which are not suitable for planting. They may be obtained by separating them from a mass of delinted seed by any suitable manner such as, for example, by floatation processes, mechanical screening and the like. The ground cottonseed culls are composed of cottonseed meal, oil and hulls. Although the culls are composed principally of oil and protein, they contain about 15% carbohydrates.

Finally, a supply of commercial peat moss is added to the above constituents. It is useful as a means of loosening and aerating the soil to give better plant growth and also to render the soil more moisture retentive.

The above constituents are then mixed together to form a heterogeneous mass and may then be packaged or stored for eventual use.

The following examples illustrate two compositions embodying the principles of the invention but should not be construed as limiting the invention:

Example I

| | Percent |
|---|---|
| Degenerate hydrocellulose saturated with hydrochloric acid | 60 |
| Ground acid delinted cottonseed culls | 20 |
| Commercial peat moss | 20 |

Example II

| | |
|---|---|
| Degenerate hydrocellulose saturated with hydrochloric acid | 60 |
| Ground acid delinted cottonseed culls | 15 |
| Commercial peat moss | 10 |
| 20% superphosphate fertilizer | 10 |
| Ammonium sulphate | 5 |

The Example I has been found to give excellent results when used in mulching soil for flowers, fruits, vegetables, trees, and shrubs which are of a variety which thrive in acid soils. It has been found that the plant food will not burn the soil regardless of the amount employed.

The plant food of Example II has been found to give excellent results when used on lawns of all types. This embodiment may be used in place of the plant food described in Example I, however, care must be exercised to not apply too large a quantity to tender plants as the superphosphate fertilizer content will tend to burn young plants.

I claim:

An acid soil conditioning composition comprising a mixture of a major proportion of an acid-containing hydrocellulosic substance produced by the delinting of cottonseed with hydrochloric acid gas and a minor proportion of at least 15% of ground delinted cottonseed culls.

References Cited in the file of this patent

UNITED STATES PATENTS

| | | |
|---|---|---|
| 103,085 | Ruggles | May 17, 1870 |
| 318,371 | Haas | May 19, 1885 |
| 346,024 | Colquitt | July 20, 1886 |
| 1,944,788 | Genz | Jan. 23, 1934 |
| 2,017,090 | Eggert | Oct. 15, 1935 |